(12) United States Patent
Bowers

(10) Patent No.: US 10,239,163 B2
(45) Date of Patent: Mar. 26, 2019

(54) PIPELINE WELD REPAIRING METHOD AND APPARATUS

(75) Inventor: Jonathan Bowers, Hull East Yorkshire (GB)

(73) Assignee: Saipem S.p.A., Milan (IT)

( * ) Notice: Subject to any disclaimer, the term of this patent is extended or adjusted under 35 U.S.C. 154(b) by 1749 days.

(21) Appl. No.: 13/516,614

(22) PCT Filed: Dec. 16, 2010

(86) PCT No.: PCT/GB2010/052101
§ 371 (c)(1),
(2), (4) Date: Sep. 26, 2012

(87) PCT Pub. No.: WO2011/073660
PCT Pub. Date: Jun. 23, 2011

(65) Prior Publication Data
US 2013/0008548 A1 Jan. 10, 2013

(30) Foreign Application Priority Data
Dec. 17, 2009 (GB) .................................. 0922096.3

(51) Int. Cl.
*B23K 37/02* (2006.01)
*B23C 1/20* (2006.01)
(Continued)

(52) U.S. Cl.
CPC ............ *B23K 37/0217* (2013.01); *B23C 1/20* (2013.01); *B23C 3/30* (2013.01); *B23K 9/0286* (2013.01);
(Continued)

(58) Field of Classification Search
CPC ...... B23K 9/0286; B23K 9/028; B23K 26/34; B23K 31/00; B23K 37/08
(Continued)

(56) References Cited

U.S. PATENT DOCUMENTS

| 3,084,244 A | 4/1963 | Rieppel et al. |
| 3,084,246 A * | 4/1963 | Rieppel et al. .......... 219/124.21 |

(Continued)

FOREIGN PATENT DOCUMENTS

| CA | 1150778 A1 | 7/1983 |
| CN | 201357273 Y | 12/2009 |

(Continued)

OTHER PUBLICATIONS

International Search Report (PCT/ISA/210) dated Apr. 7, 2011, by the European Patent Office as the International Searching Authority for International Application No. PCT/GB2010/052101.

(Continued)

*Primary Examiner* — Brian W Jennison
(74) *Attorney, Agent, or Firm* — Buchanan Ingersoll & Rooney PC

(57) ABSTRACT

A method for repairing a defective circumferential weld joint between two pipe sections in a pipeline is described. A weld excavation machine is used to remove a weld defect. The machine comprises a weld excavating tool and a tool guiding apparatus. The machine may be modular in form allowing the machine to be dissembled into discrete portable parts. The method includes arranging the tool guiding apparatus in fixed relation to the pipeline, guiding the weld excavating tool around the pipe and along the weld joint by means of the tool guiding apparatus and using the weld excavating tool to remove material from the defective weld region. An excavation may thus be formed having parallel vertical walls. The excavation is then filled with weld material by means of a welding apparatus.

27 Claims, 5 Drawing Sheets

(51) Int. Cl.
*B23C 3/30* (2006.01)
*B23K 9/028* (2006.01)
*F16L 13/02* (2006.01)
*F16L 55/18* (2006.01)

(52) U.S. Cl.
CPC .......... *B23K 37/0276* (2013.01); *F16L 13/02* (2013.01); *F16L 55/18* (2013.01)

(58) Field of Classification Search
USPC ............. 219/60 A, 69.17, 69.2, 126, 124.21, 219/124.22, 137 R
See application file for complete search history.

(56) References Cited

U.S. PATENT DOCUMENTS

| | | | |
|---|---|---|---|
| 4,540,870 A | 9/1985 | Kaufmann | |
| 4,625,464 A | 12/1986 | Kubo | |
| 4,630,976 A | 12/1986 | Belcher | |
| 4,916,282 A | 4/1990 | Chamming's et al. | |
| 5,359,172 A | 10/1994 | Kozak et al. | |
| 5,361,285 A | 11/1994 | Formanek | |
| 5,514,849 A | 5/1996 | Findlan et al. | |
| 5,764,859 A * | 6/1998 | Kim et al. | 706/20 |
| 6,211,482 B1 | 4/2001 | Findlan et al. | |
| 6,968,768 B2 | 11/2005 | Ricci | |
| 7,225,968 B2 | 6/2007 | Packer et al. | |

FOREIGN PATENT DOCUMENTS

| | | |
|---|---|---|
| GB | 960897 | 6/1964 |
| GB | 2316903 A | 3/1998 |
| JP | 59-183967 A | 10/1984 |
| JP | 05-077051 A | 3/1993 |
| JP | 7-040216 A | 2/1995 |
| JP | 07-214329 A | 8/1995 |
| JP | 7-223073 A | 8/1995 |
| JP | 08-206909 A | 8/1996 |
| NL | 8 200 402 A | 9/1983 |
| RU | 2 277 667 C1 | 4/2006 |
| WO | 2008/107185 A2 | 9/2008 |

OTHER PUBLICATIONS

Written Opinion (PCT/ISA/237) dated Apr. 7, 2011, by the European Patent Office as the International Searching Authority for International Application No. PCT/GB2010/052101.
Written Opinion of the International Preliminary Examining Authority (PCT/IPEA/408) dated Apr. 5, 2012, by the European Patent Office as the International Preliminary Examining Authority for International Application No. PCT/GB2010/052101.
International Preliminary Report on Patentability (PCT/IPEA/409) dated Jun. 5, 2012, by the European Patent Office as the International Preliminary Examining Authority for International Application No. PCT/GB2010/052101.
Search Report dated Mar. 18, 2010, issued in corresponding United Kingdom Patent Application No. GB0922096.3. (4 pages).
"Gas Metal Arc Welding" From Wikipedia, the free Encyclopedia, http://en.wikipedia.org/wiki/Gas_metal_arc_welding, Nov. 2, 2009, pp. 1-10.
"'Shielded Metal Arc Welding" From Wikipedia, the free Encyclopedia, http://en.wikipedia.org/w/index.php?title=Shielded_metal_arc_welding&oldid=32362, Nov. 3, 2009, pp. 1-8.
McPhail et al. "Measuring Construction Stresses in Offshore Pipeline" Journal of Petroleum Technology, Mar. 1974, vol. 26, No. 3, pp. 261-268.
Yurchenko, et al., "The construction and welding a pipeline of corrosion resistant steel for nuclear industry," M. Atomizdat, 1966, p. 226 (1-4), with translated relevant part of cited source.
Office Action (Request of Substantive Examination) dated Dec. 2, 2014, by the Russian Patent Office in corresponding International Application No. PCT/GB2010/052101, and an English translation of the Office of Action.

* cited by examiner

PIPELINE WELD REPAIRING METHOD AND APPARATUS

BACKGROUND OF THE INVENTION

The present invention relates to an apparatus and method for repairing a weld joint between pipes that have been welded together. In particular, but not exclusively, the invention relates to repairing welds between pipe sections when laying pipelines underwater at sea.

When laying a pipeline at sea from a pipe-laying vessel, one end of the pipeline (sometimes referred to as the "pipe string") is held by the vessel and a pipe section is welded to the end of the pipeline. The pipeline and newly welded pipe section are then fed out from the vessel, so that the process can be repeated. The weld joint must be of high quality in view of the high tensile loads to which the pipeline is subjected during the laying process.

A known technique for adding a new pipe section to the end of a pipeline includes beveling the ends of the pipes to be joined, arranged the pipes end to end thereby defining a circumferential groove to be welded, and then welding the pipes together by means of one or more externally mounted semi-automated GMAW welding heads which deposit weld material in the groove. The quality of the weld may then be checked by means of non-destructive testing (NDT), such as ultrasonic testing and a visual inspection performed with the aid of cameras. If a weld defect, for example a crack or lack of fusion, is detected the defect will be repaired if feasible. A known method of effecting such a repair includes removing weld material by means of "arc air gauging", followed by manually grinding the resulting excavation, and then manually filling the excavation with weld material by means of a shielded metal arc welding (SMAW) method. The quality of the repair is inspected manually by means of an ultrasonic probe. The repair process described above typically takes an hour to complete. During the repair operation, other activities on board the vessel are suspended until the repair is completed. Production delays due to such repairs are extremely expensive. If a repair is not feasible, the pipeline is retracted, cut and the process of joining a new pipe section to the end of the pipeline is started again. Cutting the pipeline in this fashion is rare as it severely delays production, and as such, performing a repair is the preferred option.

The above described method of removing weld material includes remelting the material and blasting it out of the joint by means of a high-pressure airflow, leading to spatter and an irregular excavation. Irregularities in the excavation can make re-welding the joint properly a difficult task.

The present invention seeks to mitigate the above-mentioned problems. Alternatively or additionally, the present invention seeks to provide an improved method of laying a pipeline, an improved weld repairing method, and/or an improved pipe-weld repairing apparatus.

SUMMARY OF THE INVENTION

The present invention provides a method of repairing a circumferential weld joint formed between two pipe sections in a pipeline, wherein the method comprises the steps of
   identifying a defective weld region in the weld joint,
   providing a weld excavating tool,
   guiding the weld excavating tool around the pipe and along the weld joint and using the weld excavating tool to remove material from the defective weld region, thereby forming an excavation, and
   using a welding apparatus to weld the excavation and fill the excavation with weld material.

Advantageously, the welding tool is guided by means of a tool guiding apparatus. The tool guiding apparatus is preferably arranged in fixed relation to the pipeline. The weld excavating tool and the tool guiding apparatus may be provided as parts (assembled or dissembled parts) of a weld excavating machine. Using such a method to repair a weld defect may enable repairs to be made faster than possible with manual methods of the prior art. Faster repairs are made possible as a result of forming an excavation by means of a guided excavating tool, which is advantageously able to produce an accurate and small volume excavation that may be efficiently re-filled with weld material.

The tool guiding apparatus is preferably fitted to the outside of the pipeline and the repair performed from the outside of the pipes.

Repairs to weld defects are typically performed by skilled operators. Embodiments of the present invention provide greater capacity for mechanisation and/or automation of repairing of welds, where the need for a skilled operator to perform the entire method is reduced.

Preferably, the tool guiding apparatus is portable. Preferably, the weld excavating tool is portable. Using portable apparatus to perform the method of the invention has the advantage that the apparatus for performing the method can be brought to the position of the weld defect without the need to use special lifting equipment. The apparatus may conveniently be manually carried. The weld excavating machine is preferably arranged in modular form. The modular parts that make up the machine may each be portable. Thus, the weld excavating machine may when assembled be too heavy to carry, but may be configured to be dissembled into a small number of portable parts. Each such portable part may have a mass of 55 Kg or less, preferably has a mass of 35 Kg or less, and more preferably has a mass of 25 Kg or less. Preferably, no more than three of the modular parts that form the machine have a mass of more than 10 Kg. Preferably, the machine is so configured that when the machine is dissembled into a form suitable for carrying, there are no more than six modular parts having a mass greater than 1 Kg. Preferably, the machine may be dissembled into ten or fewer parts. The machine may have a mass of greater than 50 Kg. The machine may have a mass of greater than 70 Kg. The machine may have a mass of less than 100 Kg. The machine may have a mass of less than 150 Kg. The modular parts that make up the machine may include a first modular part having a mass of between 10 Kg and 55 Kg (preferably between 10 Kg and 35 Kg) and a second modular part having a mass of between mass of between 10 Kg and 55 Kg (preferably between 10 Kg and 35 Kg). The second modular part may be arranged to transport and guide the first modular part around the pipes. For example, the second modular part may comprise the tool guiding apparatus. The first modular part may comprise the weld excavating tool.

The excavation formed may be such that, immediately before re-welding the excavation, the excavation has opposing side walls and a base. Thus, the excavation need not extend so far into the pipe wall as to create a hole extending between the interior and exterior surfaces of the pipe. The excavation preferably has a substantially constant cross-sectional shape. The excavation preferably has a geometry similar to that of a bevelled groove between two pipe ends of the kind formed when initially welding the pipes together. For example, the walls defining the excavation may be configured not to diverge significantly with increasing distance into the excavation. The walls defining the excavation may, near the bottom of the excavation, converge with increasing distance into the excavation (so that for example, the bottom of the excavation does not have a square-edged shape). The base of the excavation may be rounded for example. Forming an excavation having a geometry comparable to the common bevel geometries for forming standard welds between pipe sections has the possible advantage of making welding of the excavated weld joint easier and more straightforward, as standard automatic or semi-automatic welding apparatus may be used for example. Also, machining away material in a regular and well-defined manner can remove the need for additional grinding of the excavation before the repair weld is formed. The excavation may have opposing side walls which are parallel for the majority of their depth. The weld excavating tool may be arranged to cut a vertically walled channel, for example. Removing material from the defective weld region by creating a vertically walled channel makes mechanical removal of material easier, as it may be performed by means of a tool operated to cut in a single (downward) direction, with relatively low reaction forces in other directions. As such the forces that the tool guiding apparatus and/or the weld excavating tool need to withstand may be lower. Consequently, the structural size and mass of the tool guiding apparatus and/or the weld excavating tool may be less. Also, vibration caused during the step of removing material from the defective weld region may be reduced.

The side walls of the groove may be separated by a distance of between 3 mm and 15 mm, preferably by a distance of between 6 mm and 12 mm. The excavation may have a width of less than 15 mm at the cap, preferably less than 12 mm. Having such a narrow excavation requires less welding material to fill the excavation and therefore saves time.

The guiding of the weld excavating tool along the weld joint by means of the tool guiding apparatus is preferably performed simply by causing the weld excavating tool to follow a set path. The set path may be a curved path having its axis aligned with that of the pipes. During travel of the weld excavating tool along the weld joint, there may therefore be no adjustment of position of the tool in a direction parallel to the axis of the pipes and no need for weld joint or bevel tracking.

The step of using the weld excavating tool to remove material may be performed by mechanically removing material. For example, material may be mechanically machined away by means of milling, grinding and/or cutting. The weld excavating tool may include a rotatable cutter. The rotatable cutter may have a rotating part configured to remove material when rotated. The rotatable cutter may have a cutting edge defined at or around the circumference of a rotating part of the cutter.

Material may be progressively removed by means of reciprocating the excavating tool over the defective weld region. Several passes may be required in order to remove sufficient material to machine out the defect. For example, the excavating tool may be moved to and fro (for example reciprocated) over the defective weld region and thereby perform three or more machining passes. Alternative embodiments of the invention may enable sufficient material to be removed during a single pass of the excavating tool in order to machine out the defect.

The weld excavating machine is preferably arranged to be able to excavate into the pipes at a preselected axial position along the pipes. The weld excavating machine is preferably arranged to be able to excavate into the pipes at a preselected circumferential region around the pipes. The weld excavating machine is preferably arranged to be able to excavate into the pipes down to a preselected depth. The width of the excavation so formed is preferably determined simply by the size of the weld excavating tool used. A fixed width of excavation, of the order of 6-12 mm may be sufficient to remove the vast majority of single defects without requiring the tool to be moved axially along the pipes.

The pipeline may be subjected to a tension load during the repairing of the weld. The tension load may be greater than 10 kN and may even be greater than 100 kN. The tension in the pipeline may be relatively low at the region at which the weld is repaired, but relatively high at a position downstream of that region. The method of the present invention has particular application during a method of laying a pipeline at sea, when repairing of a weld defect may slow down or frustrate other operations concerning the laying of the pipeline from the vessel.

The step of using the welding apparatus to weld the excavation may be performed by any suitable means. One or more GMAW welding torches may be used. The use of GMAW torches aid automation of the welding of the excavation. The GMAW torches may perform MIG welding.

The welding apparatus may weld at a substantially constant speed along the weld. The welding apparatus may include an automatic welding voltage control unit. The welding head may be arranged to oscillate across the width of the weld joint. The external welding apparatus may include an external clamp mechanism, for example a band, on which the one or more welding heads are mounted. Preferably, the welding apparatus is guided around the pipe and along the weld joint by means of the same tool guiding apparatus that is used to guide weld excavating tool around the pipe.

The present invention also provides a weld excavating machine, for example a weld excavating machine suitable for carrying out the method of the present invention. The weld excavating machine comprises a mechanical weld excavating tool and a tool guiding apparatus. The mechanical weld excavating tool is preferably mounted on the tool guiding apparatus. The tool guiding apparatus may be arranged for fixing to a pipeline, and may for example include one or more fastening devices for this purpose. The tool guiding apparatus is able to be arranged to move and guide the weld excavating tool around the pipes in a circumferential direction. The weld excavating machine is preferably arranged to be able to excavate the weld down to a pre-selected depth that does not penetrate through the pipe wall. Thus, the weld excavating machine is able to excavate a weld to a depth that is short of cutting through the pipe wall. The weld excavating machine may for example include a stop mechanism for selecting a depth of excavation into the pipe wall.

It will of course be appreciated that features described in relation to one aspect of the present invention may be incorporated into other aspects of the present invention. For example, the apparatus of the invention may incorporate any of the features described with reference to the method of the invention and vice versa.

DESCRIPTION OF THE DRAWINGS

An embodiment of the present invention will now be described by way of example only with reference to the accompanying schematic drawings of which.

DETAILED DESCRIPTION

The presently described embodiment of the invention concerns the repairing of a weld joint between pipe sections in a pipeline being laid at sea from a floating vessel. It will be appreciated that the pipe sections and the pipeline may be referred to simply as pipes and that a pipe section may or may not form one end of a pipeline. The pipeline is laid overboard a vessel by welding successive sections of pipe to the end of the pipeline. When laying a pipeline, the tension in the pipeline being laid is significant and is typically of the order of several hundreds of kilo-Newtons. It is therefore of particular importance to ensure that the joints between the sections of pipe that make up the pipeline are of a very high quality. Failure of any joint in the pipeline after the joint has been lowered from the vessel into the water can be possibly dangerous and extremely costly.

Successive pipe sections are welded to the end of the pipeline as it is laid overboard from the vessel. The ends the pipes being joined are bevelled. One pipe end is defined by the end of the pipeline being laid and the other pipe end is a new pipe section being added to the end of the pipeline to extend the pipeline. The pipe sections are arranged end to end thereby defining a circumferential joint to be welded, the geometry of the joint being dictated by the type of bevel (as is well understood in the art).

A first welding station is provided for forming a root weld between the pipe sections. The pipes are aligned and held in place by means of a suitable clamp system. The welding station includes an exterior welding apparatus including several external GMAW (MIG) welding heads. The welding heads are mounted on an external guiding apparatus clamped to the exterior of the pipes in a manner well known in the art (in the same manner as "bug-on-band" systems for example). In use, the welding heads are guided along the joint to be welded partly by the exterior guiding apparatus. Given that the weld is formed around the circumference of the pipes, the welding process is typically referred to as girth-welding. Successive stations are provided downstream for forming further girth welds. There may for example be five separate stations along the length of the pipelines for forming the root weld, fill welds, and the cap weld. One or more of the stations include NDT equipment for performing non-destructive testing (NDT). The station may be a dedicated NDT station (for example at the station furthest downstream) or one which also includes means for welding the pipes (for example at a station for forming the root weld, a particularly critical step in the welding together of the pipe sections).

Figure 1:
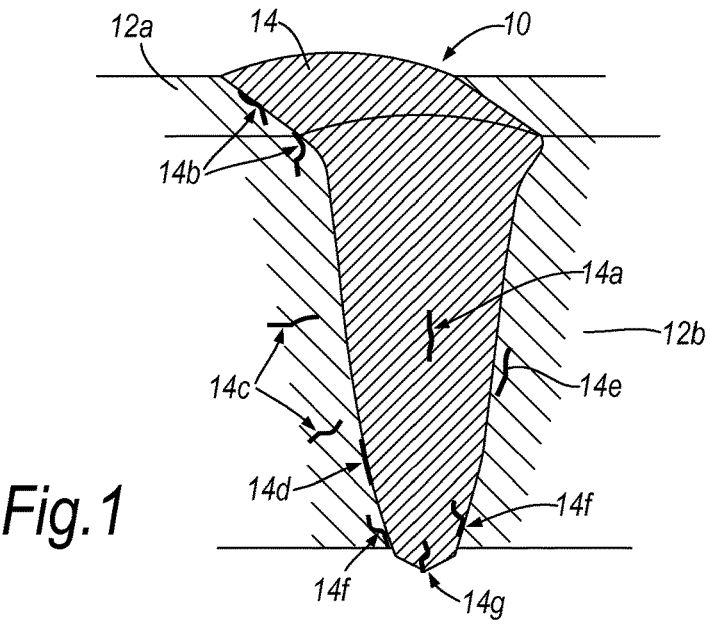
FIG. 1 is a cross-sectional view of a weld joint between two pipes showing the types of weld defects that can be present.

The NDT tests include inspecting the weld with ultrasonic sensors and performing visual inspections of the weld from inside and outside the pipes, for example with the use of a camera system. FIG. 1 shows the types of defects 14 that may be detected in a weld joint 10 between two pipe sections 12a, 12b. It will of course be understood that the drawing of the weld joint 10 of FIG. 1 is exemplary and the geometry may be different in reality with a groove having walls of a different geometry. It will be noted that the geometry of the groove shown in FIG. 1 has walls that are near-parallel for the majority of their depth. At the cap 14, the weld joint is about 7.0 mm wide. Thus, possible defects include a crack 14a in the middle of the weld, a toe crack 14b near the cap, a heat-affected zone crack 14c, a weld interface crack 14d, an under-bead crack 14e, a root crack 14f or a root surface crack 14g.

Figure 2A:
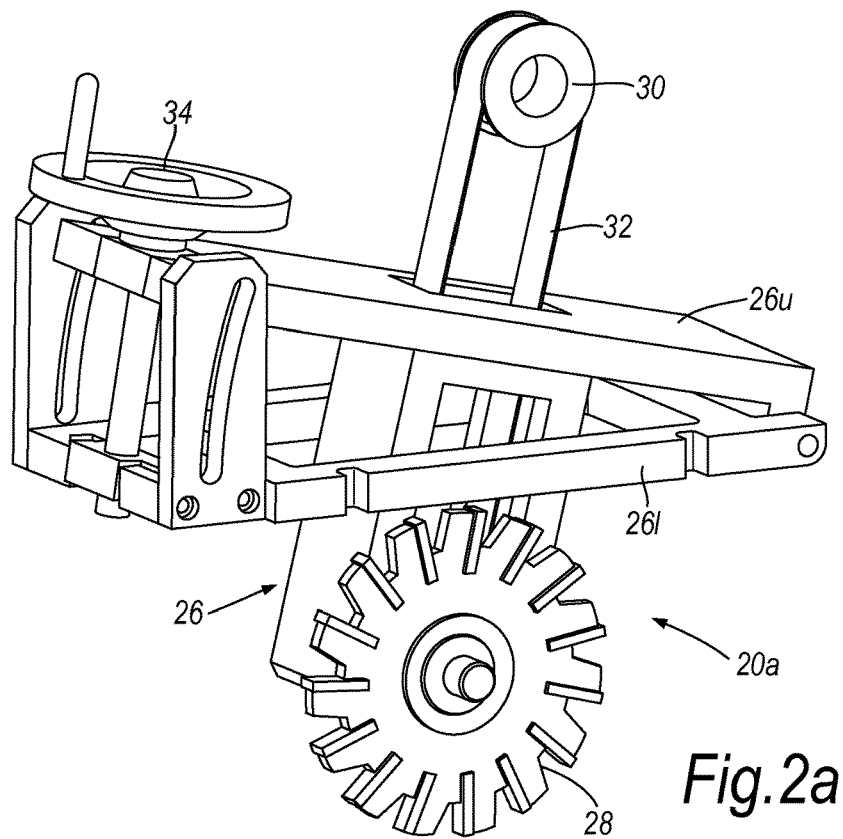
FIG. 2a is a perspective view of a weld cutting tool of the embodiment of the invention.
Figure 2B:
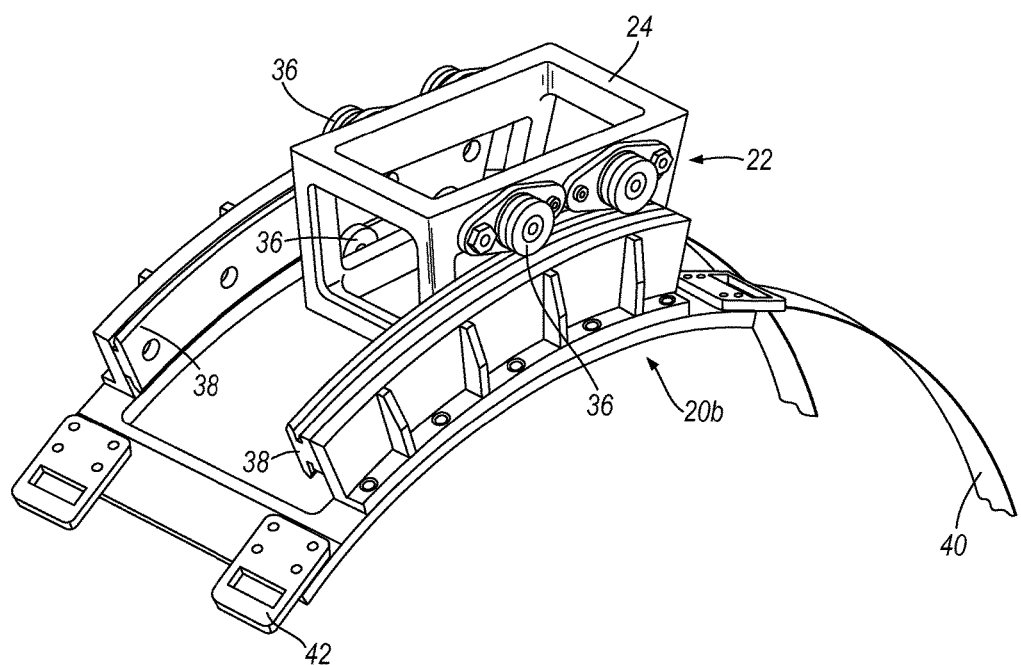
FIG. 2b is a perspective view of a cradle/trolley and guiding apparatus of the embodiment of the invention.

If a weld defect 14 is detected, a repair may be performed using a weld excavation machine according to the embodiment of the present invention. The apparatus 20 embodying the weld excavation machine is shown in its dissembled state is illustrated schematically by FIGS. 2a and 2b, which shows a first modular part 20a and a second modular part 20b, respectively, of the apparatus 20. The second modular part 20b, which performs the function of a guiding apparatus, comprises a trolley 22 (shown in FIG. 2b) that carries a cradle 24. The first modular part 20a of the apparatus 20, which performs the function of a weld excavating tool, includes a milling machine 26 (shown in FIG. 2a) that in use is accommodated within the cradle 24 of the second modular part 20b. The milling machine 26 includes a rotating cutting tool 28 driven by a motor (omitted for the sake of clarity) which drives a drive wheel 30 on which a drive belt 32 is mounted. The drive belt 32 engages a driven wheel fixedly attached to the rotating cutting tool 28. The depth to which the cutting tool cuts is set by means of a depth gauge wheel 34. Turning the depth gauge wheel 34 causes an upper part 26u of the milling machine linked to the cutting tool 28 to pivot relative to a lower part 26l, which in use is fixed to the cradle 24. The trolley 22, shown in FIG. 2b, includes the cradle 24 to which the lower part 26l of the milling machine 26 is, in use, fixed and four pairs of wheels 36 that run on tracks 38, two pairs on the upper side of the tracks and two pairs (mostly hidden from view in FIG. 2b) on the lower side of the tracks 38. The tracks 38 have a shape and length that matches a sector of the circumference of the pipes 12. The tracks 38 are attached to tension belts 40 that in use are passed around the pipes 12 and fastened and tightened to fixing points 42 at opposite ends of the second modular part 20b. Thus, it will be observed that the milling machine 26, integrated cutting tool 28 and motor and other parts of the apparatus shown in FIG. 2a are provided as a first modular unit 20a and the trolley and its cradle, tracks and belts and the other parts of the apparatus shown in FIG. 2b are provided as a second modular unit 20b. Each modular unit 20a, 20b has a mass of about 25 Kg and may therefore be readily manually handled. The two modular units together form the whole apparatus 20 required to excavate a defective weld, once the apparatus is connected to a power source.

Figure 3A:
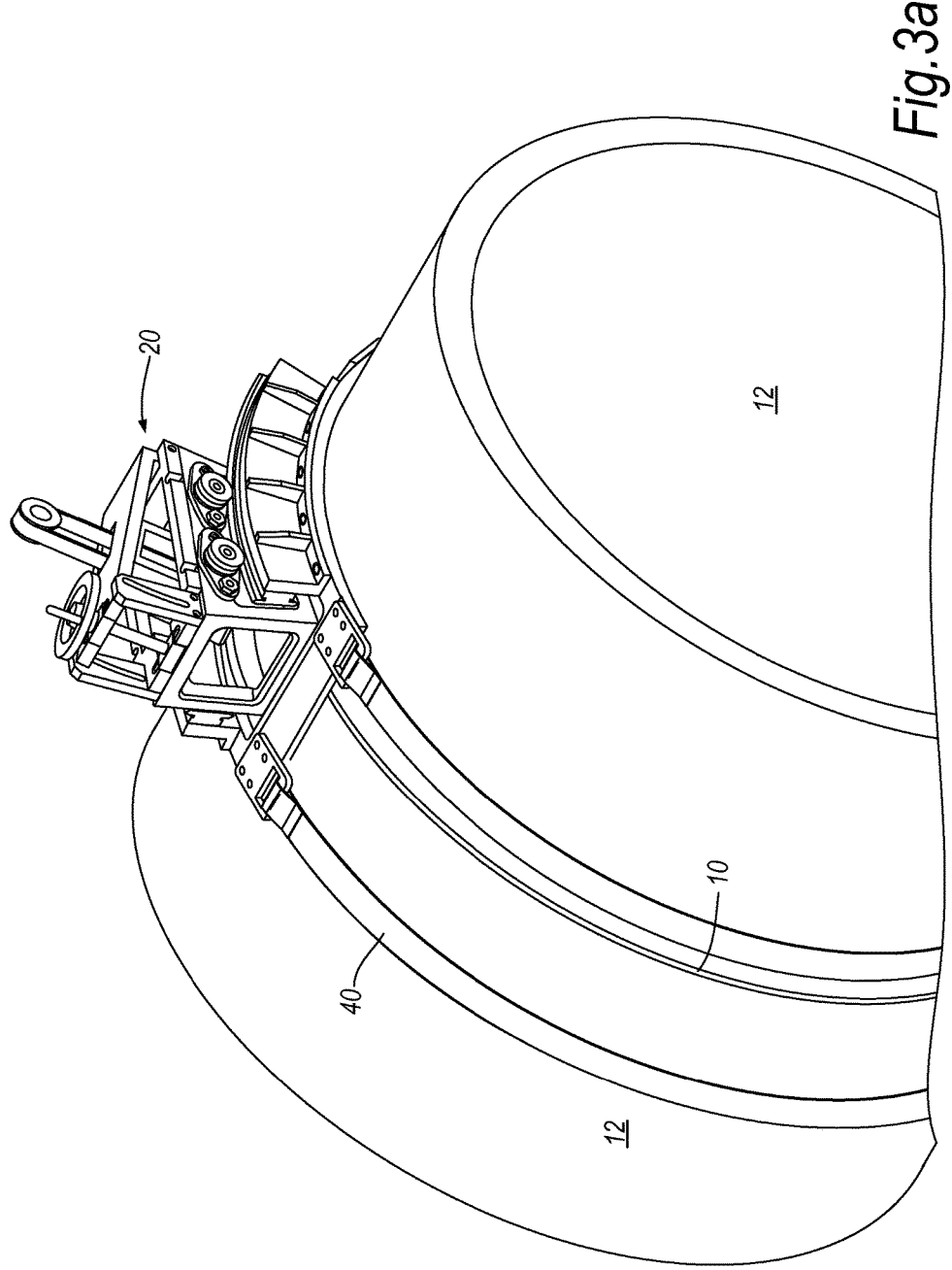
FIG. 3a is a perspective view of the apparatus of the embodiment of the invention assembled on a pipeline.
Figure 3B:
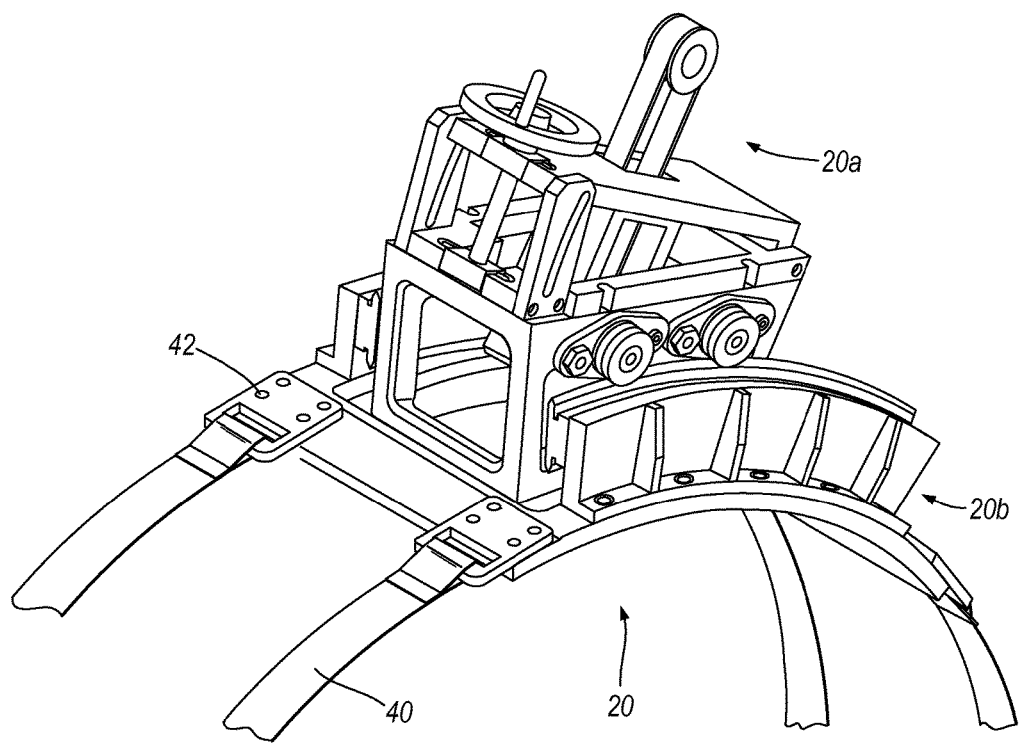
FIG. 3b is an enlarged view of part of FIG. 3a, omitting the pipeline for the sake of clarity.

In the event a defect 14 is detected, its position in the weld 10 is noted including the defect's circumferential position, depth in the weld, and axial position along the pipes 12 (i.e. central, towards the upstream pipe-section or towards the downstream pipe-section). Any welding equipment attached to the pipe is removed and the second modular unit 20b (shown in FIG. 2b) is attached to the pipes 12 in line with the defect by means of the tension belts 40, which pass around the entire circumference of the pipes (only part of the belt is shown in FIGS. 2b and 3a). The first modular unit 20a (shown in FIG. 2a) is then fixed (via bolts, not shown) to the second modular unit 20b thereby forming the weld excavation apparatus 20 according to the embodiment of the present invention as shown in FIG. 3a. The positioning of the second modular unit 20b on the pipes 12 is carefully selected so as to ensure that the cutting tool 28 is aligned with the defect 14.

The cutting tool 28 is moved to a circumferential location around the pipes 12 at a location behind the defect 14. The milling machine is then driven along the circumference of the pipes over the defect. The cutting tool 28 is operated to cut material from the weld joint 10 and/or the surrounding pipe material. The tool 28 is reciprocated along the circumference of the pipes 12 so that the cutting tool 28 progressively removes the material, in the profile of the cutter, to the required length and depth. The depth of cutting is progressively increased by means of the gauge wheel 34, but the tool 28 could additionally or alternatively have a depth stop mechanism which allows the cutting tool 28 to cut down progressively until stopped by the depth stop mechanism.

Figure 4A:
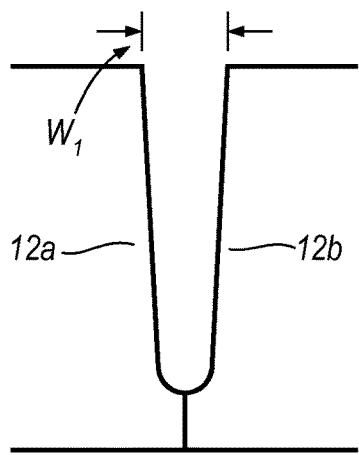
FIG. 4a is a cross-section of two bevelled pipes arranged end-to-end to define a joint to be welded.
Figure 4B:
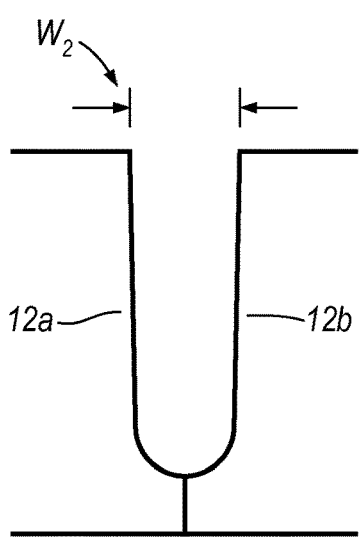
FIG. 4b is a cross-section of a repair joint to be welded after excavation by the apparatus of the embodiment of the invention.

The excavation produced is illustrated in FIG. 4b and has substantially parallel walls almost the entirely down to the bottom of the excavation and is therefore very regular and narrow (having $W_2$ of about 8.0 mm wide). By way of comparison, the geometry of a typical joint before welding is shown in FIG. 4a, which shows the joint to be welded formed between two bevelled pipes. The bevel has a width $W_1$ of about 7.0 mm at its top and a width of about 4.8 mm at the bottom. The angle defined between the walls is about 4 degrees (i.e. about 2 degrees to the vertical centreline of the cross-section). It will be noted that the excavation therefore has a width that is greater than the greatest width of the joint immediately before welding. Once the excavation is completed, the milling machine 26 is removed, but the tracks 38 are left in place. The excavation is then re-welded using narrow gap mechanised GMAW equipment of a type identical to that described above, using the tracks 38 to guide the welding apparatus along the joint to be welded (defined by the excavation). The welding equipment, being semi-automated (driven at substantially constant speed along the joint, guided by the tracks, automatically oscillated across the width of the joint, subject to automatic voltage control) allows for significantly faster re-welding times to be achieved compared to conventional manual welding techniques.

Thus, it will be seen that an automatic milling machine has been developed, which can excavate a repair area bevel on a mainline weld, providing an accurate and small excavation that may be efficiently re-filled with weld material, as a result of forming an excavation having a geometry comparable to the common bevel geometries for forming standard welds between pipe sections. Additional grinding is not required. The weld repair process is therefore much faster than previous techniques. The apparatus is able to excavate down to different width and length at all the positions around the pipe. Furthermore, the excavation apparatus, when dissembled into its small number of modular units is readily handled manually.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It may be necessary to withdraw the pipeline so that the defective joint is repaired at the first welding station. In such a case, the tension in the pipeline may be significantly less than 100 kN at the location at which the repair is effected. However there may be tension downstream of the repair location in the pipeline that still exceeds 100 kN.

More than two modular parts could be provided. Having more than two modular parts might enable each part to be less massive, but increases the complexity of the design and possibly of the assembly of the apparatus. The guiding apparatus including the trolley that form the second modular unit 20b could be used to guide a mechanised welding torch, after the defective weld has been excavated. The milling machine 26 could be removed and replaced with a welding machine configured to be mounted on, and guided by, the tracks 38 of the second modular unit 20b. The step of identifying a weld defect and then aligning the guiding apparatus and trolley of the second modular unit 20b with that defect could be partially or fully automated, instead of being performed manually. The guiding of the cutting tool along the weld joint, in the above described embodiment, is performed simply by lining up the second modular unit 20b in relation to the weld joint and the defect and then allowing the tool to be guided along the tracks. The guiding could be more sophisticated and could include a weld tracking system that causes an independently moveable cutting tool to be moved left or right (i.e. in a direction parallel to the axis of the pipes) as the trolley moves around the pipes.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of repairing a circumferential weld joint formed between two pipe sections in a pipeline, wherein the method comprises the steps of
   identifying a defective weld region in the weld joint, the weld joint having a surface and wherein identifying the defective weld region in the weld joint comprises identifying a defect located beneath the surface of the weld joint,
   providing a weld excavating machine comprising a weld excavating tool and a tool guiding apparatus,
   arranging the tool guiding apparatus in fixed relation to the pipeline,
   guiding the weld excavating tool around the pipe and along the weld joint by means of the tool guiding apparatus and using the weld excavating tool to remove material from the defective weld region, thereby forming an excavation, and
   using a welding apparatus to weld the excavation and fill the excavation with weld material.

2. A method according to claim 1, wherein the weld excavating machine comprises a plurality of modular parts, there being no more than three parts having a mass of greater than 10 Kg and no single modular part having a mass greater than 35 Kg.

3. A method according to claim 1, wherein the excavation formed is such that immediately before the step of using the welding apparatus to weld the excavation, the excavation has opposing side walls and a base.

4. A method according to claim 1, wherein the excavation formed is such that immediately before the step of using the welding apparatus to weld the excavation, the excavation has opposing side walls which are parallel for the majority of their depth.

5. A method according to claim 4, wherein the side walls where parallel are separated by a distance of between 3 mm and 15 mm.

6. A method according to claim 1, wherein the step of using the weld excavating tool to remove material is performed by mechanically removing material.

7. A method according to claim 1, wherein the step of using the weld excavating tool to remove material is performed by progressively removing material by means of reciprocating the excavating tool over the defective weld region.

8. A method according to claim 1, wherein the method is performed whilst the pipeline is subjected to a tension load greater than 100 kN.

9. A method according to claim 1, wherein the method is performed during a method of laying a pipeline at sea.

10. A method according to claim 1, wherein the step of using the welding apparatus to weld the excavation is performed by means of using at least one externally mounted automated, or at least semi-automated, welding head comprising at least one welding torch.

11. A method according to claim 1, wherein the step of using the welding apparatus to weld the excavation is performed by means of driving and automatically guiding at least one welding torch around the pipe.

12. A method according to claim 1, wherein the step of using the welding apparatus includes guiding the welding apparatus around the pipe and along the weld joint by means of the same tool guiding apparatus that is used to guide weld excavating tool around the pipe.

13. A method according to claim 1, wherein the step of using the welding apparatus to weld the excavation is assisted by means of an automatic welding voltage control unit that controls the welding voltage during welding.

14. Repair apparatus for repairing a weld joint between pipe section in a pipeline that have been welded together, the apparatus comprising
(a) NDT equipment for detecting a weld defect, wherein the weld joint has a surface and the NDT equipment is configured to identify a defect located beneath the surface of the weld joint; and
(b) a weld excavating machine comprising
a tool guiding apparatus, on which a mechanical weld excavating tool is mounted; and
a stop mechanism for selecting a depth of excavation into the pipe wall, the stop mechanism being arranged to allow selection of a depth of excavation that is short of cutting through the pipe wall
wherein
the tool guiding apparatus is arranged for fixing to a pipeline;
the mechanical weld excavating tool is mounted and guided around the pipes in a circumferential direction; and
the weld excavating machine is suitable for use in repairing a circumferential weld joint formed between two pipe sections in a pipeline, and is arranged to excavate into the pipes at a preselected circumferential region around the pipes corresponding to the region of the weld defect detected by the NDT equipment.

15. Repair apparatus according to claim 14, wherein the weld excavating machine is arranged to be dismantled into a plurality of modular parts, there being no more than three parts having a mass of between 10 Kg and 35 Kg and no single modular part having a mass greater than 35 Kg.

16. Repair apparatus according to claim 15, wherein the weld excavating machine includes a first modular part having a mass of between 10 Kg and 35 Kg and a second modular part having a mass of between 10 Kg and 35 Kg, wherein
the second modular part is arranged to transport and guide the first modular part around the pipes, and
the first modular part comprises the weld excavating tool.

17. Repair apparatus according to claim 14, wherein the mechanical weld excavating tool includes a rotatable cutter arranged to rotate and to cut a vertically walled channel.

18. A weld repair system comprising repair apparatus according to claim 14, and a welding apparatus, wherein the weld repair system is arranged to perform a method of repairing a circumferential weld joint formed between two pipe sections in a pipeline, the method comprising the steps of
using the NDT equipment to identify a defective weld region in the weld joint,
arranging the tool guiding apparatus in fixed relation to the pipeline,
guiding the weld excavating tool around the pipe and along the weld joint by means of the tool guiding apparatus and using the weld excavating tool to remove material from the defective weld region, thereby forming an excavation, and
using the welding apparatus to weld the excavation and fill the excavation with weld material.

19. A weld repair system comprising repair apparatus according to claim 14 and a welding apparatus suitable for welding within an excavation created by the excavating machine.

20. A weld repair system according to claim 19, wherein the welding apparatus includes at least one externally mountable automated, or at least semi-automated, welding head comprising at least one welding torch.

21. A weld repair system according to claim 19, wherein the welding apparatus is adapted to be mounted on and guided by the tool guiding apparatus.

22. A weld repair system according to claim 19, wherein the welding apparatus includes an automatic welding voltage control unit for controlling the welding voltage during welding.

23. A method for repairing a weld joint between pipe sections when laying pipelines underwater at sea, the weld joint having a surface and a defective weld region that includes a defect located beneath the surface of the weld joint, wherein the method comprises the steps of:
providing a weld excavating machine comprising a weld excavating tool and a tool guiding apparatus,
guiding the weld excavating tool by the tool guiding apparatus,
using the weld excavating tool to remove material from the defective weld region, thereby forming an excavation, and
using a welding apparatus to weld the excavation and fill the excavation with weld material;
and wherein
the method is a method of repairing a circumferential weld joint formed between two pipe sections in a pipeline and comprises the steps of:
identifying the defective weld region in the circumferential weld joint, arranging the tool guiding apparatus in fixed relation to the pipeline by fitting the tool guiding apparatus to the outside of the pipes;

guiding the weld excavating tool around the pipe and along the weld joint by means of the tool guiding apparatus, and arranging the weld excavating machine to excavate into the pipes at a preselected circumferential region around the pipes so as to provide an excavation suitable for girth welding.

24. A pipe repair method according to claim 23, wherein the step of using the weld excavating tool to remove material from the defective weld region is performed such that the excavation thus formed, immediately before re-welding the excavation, has opposing side walls and a base, the opposing side walls being parallel for the majority of their depth.

25. A pipe-laying vessel comprising:
(a) NDT equipment for detecting a weld defect located in a region beneath the surface of a weld joint; and
(b) a weld excavating machine for use in repairing a circumferential weld joint formed between two pipe sections in a pipeline, the weld excavating machine comprising
a tool guiding apparatus, on which a mechanical weld excavating tool is mounted such that the weld excavating tool may be moved and guided around the pipes in a circumferential direction; and
a stop mechanism for selecting a depth of excavation into a pipe wall, the stop mechanism being arranged to allow selection of a depth of excavation that is short of cutting through the pipe wall, wherein the tool guiding apparatus is arranged for fixing to a pipeline; and the weld excavating machine is arranged to excavate into the pipes at a preselected circumferential region around the pipes corresponding to the region of the weld defect detected by the NDT equipment.

26. A weld excavating machine comprising a mechanical weld excavating tool mounted on a tool guiding apparatus, wherein the tool guiding apparatus is arranged for fixing to a pipeline to enable the weld excavating tool to be moved and guided around the pipes in a circumferential direction, and the weld excavating machine includes a stop mechanism for selecting a depth of excavation into the pipe wall, the stop mechanism being arranged to allow selection of a depth of excavation that is short of cutting through the pipe wall whereby a weld defect beneath the surface of a weld joint can be excavated without cutting through the pipe wall.

27. A method according to claim 1, wherein the step of forming the excavation includes arranging the weld excavating machine to excavate into the pipeline at a preselected circumferential region around the pipeline and to a depth into the pipeline, corresponding to the position of the defect so identified.

* * * * *